3,302,420
METHOD AND APPARATUS FOR HANDLING AND
DISPOSING OF FROZEN FOOD
Willard L. Morrison, 470 King Muir Road, Lake Forest,
Ill. 60045; Lois Mae Morrison, legatee of said Willard
L. Morrison, deceased
Filed Jan. 24, 1964, Ser. No. 339,983
5 Claims. (Cl. 62—62)

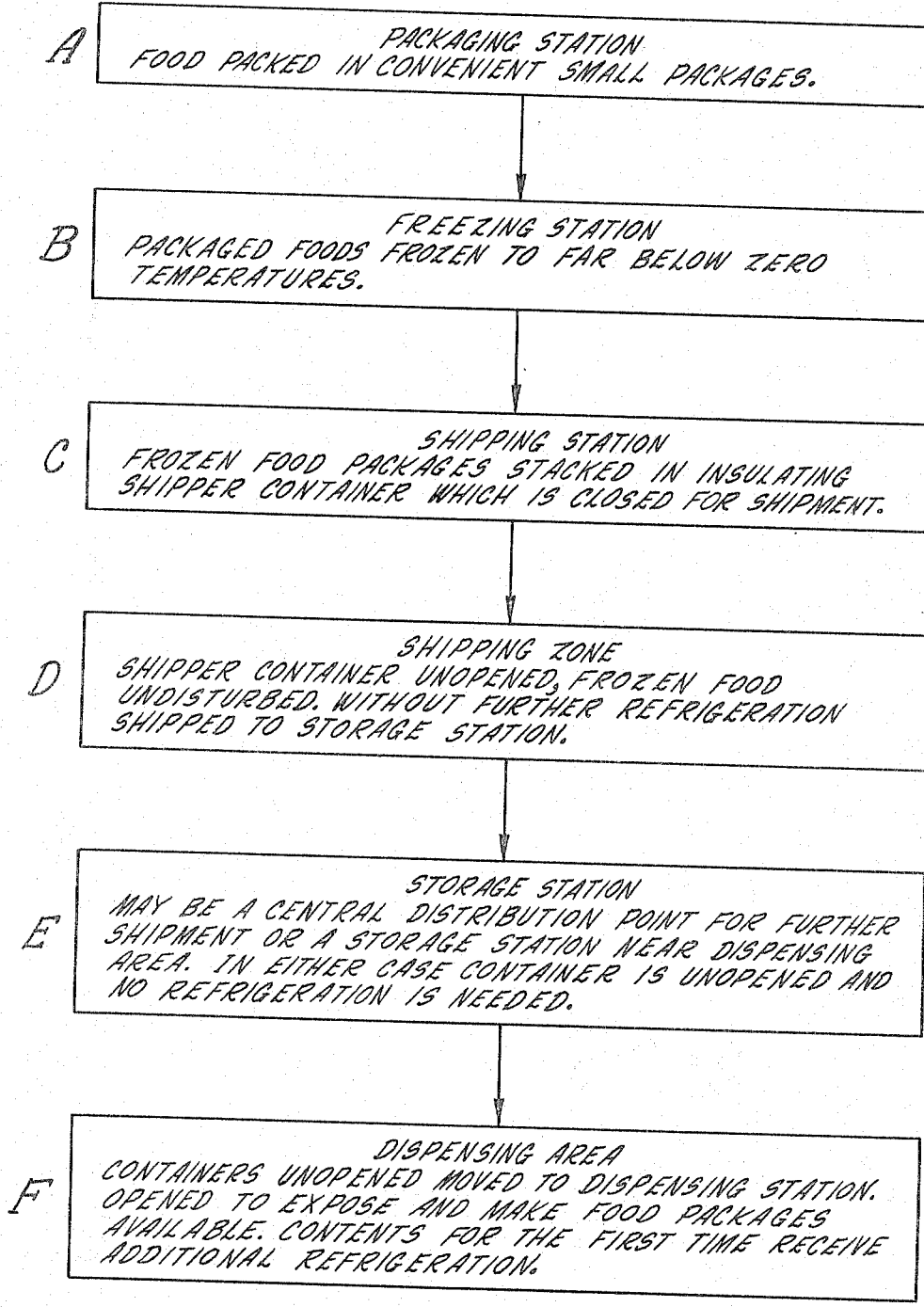

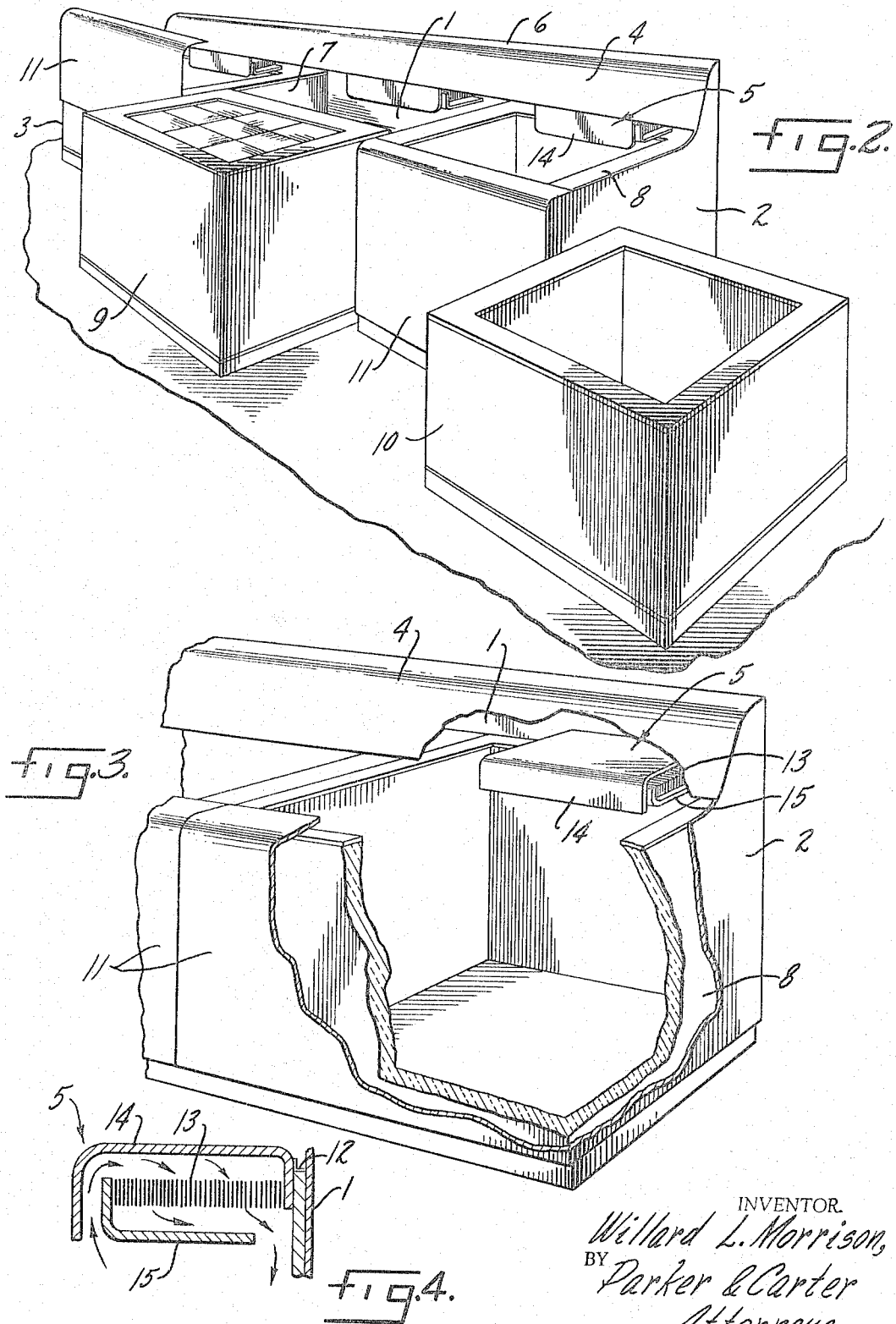

This invention relates to improvements in method and apparatus for handling and dispensing of frozen food.

One object of the invention is to provide a method and apparatus whereby frozen food may be handled and shipped from the freezing station where it is frozen to the point at which the purchaser takes possession without any intermediate handling, break of bulk and without any exposure of the frozen food to ambient warm temperatures.

Another object of the invention is to provide at a dispensing station a frozen food display and sales assembly wherein the frozen food may be contained, displayed and be available to the purchaser, the frozen food having been completely protected against exposure to ambient temperature during its travel from the freezing station to the dispensing station.

Another object is to provide at the dispensing station in combination with a removable insulated frozen food container, means localized at the station for cooling the frozen food there on display.

Another object is to provide at the dispensing station in cooperation with a portable removable frozen food container, means for pouring into the container cold air during the time that the container is available for the dispensing of food.

The freezing of food for display and purchase is a well established art. The practice heretofore has been to package the food, send the food packages into a freezer, perhaps a wind tunnel at the freezing station, wherein the packages are frozen to the desired below zero degrees F. temperature. These packages are then stored in a cold room, after which the packages are taken out, exposed to ambient outside temperature and packed in an insulated truck or car which may preferably be chilled by refrigeration machinery. The truck or car then carries the frozen food to a storage or distribution center where the packages are taken out, carried across the loading dock, exposed to ambient temperature and put into a cold storage room. Later the packages are taken out of the cold storage room, carried across the dock in the open air, put in a truck which may or may not be refrigerated and then carried to the retailers' dock where again the foodstuff is exposed to ambient temperature on its way to the retailer's cold room. After that the foodstuff is carried from the retailer's cold room to and placed in the refrigerated display counter for display and sale.

The above practice results in repeated warming and cooling of the food with repeated breaking of bulk of the food on its way from the freezing station to the dispensing station, the food being frequently exposed to ambient high temperature with resultant warming and then again being cooled off ready for the next warming. This cannot possibly be good for the food.

It is of the utmost importance that the food be maintained at below freezing, preferably below zero degrees F. from the completion of the initial freezing to the time when the purchaser takes it out of the freezer display counter. The method above pointed out is an effort to maintain this temperature. Experience teaches that it seldom does it. It frequently happens that temperature rises above zero degrees or even freezing at one or other of the steps and as a result deterioration occurs.

The present invention requires the presence in the cold room at the freezing station where the frozen food packages come out of the freezer of a collapsible portable insulating shipper container. This shipper container comprises an insulating pallet on which the food packages may be stacked without banding. Insulating walls are carried by the pallet, may be collapsed while the food packages are stacked, and will be subsequently expanded to enclose the stacked frozen food packages in a closable insulated container. After which the container will be closed by a removable insulating cover.

The shipper container may well be the type disclosed in co-pending applications Serial Nos. 261,748 and 261,749 both filed February 28, 1963, because the collapsing of the insulating walls makes it easy to stack the frozen food and also makes it easy to return the spent shipper container when emptied with reduced bulk but of course a shipper container with solid or non-collapsible walls might also be used.

The closed insulating shipper container may then be shipped on an open truck or by other suitable means to a distribution station or direct to a merchandiser. In either case, the container will be closed, handled without breaking bulk and finally opened only when it reaches the disposal point.

The shipper container insulates the frozen food against warm ambient atmosphere from the freezing station clear to the disposal station. It is only opened when necessary to renew the supply of frozen food at the dispensing station. At that time the preceding spent shipper container is withdrawn from the dispensing station, replaced by the new open container, which makes available a new supply of frozen food.

A removable false front will mask the shipper container and means associated with and localized at the dispensing station and quite independent of the shipper container will limit, if not totally prevent, temperature rise. These means may well take the form of pouring cold air into the open shipper container which now serves as a frozen food dispensing bin though other removable cooling means may be used, the same cooling means being available for the cooling of successive cold food shipper containers.

If the collapsible walled shipper container is used, it may be convenient to slightly collapse the walls before the filled container is moved into the disposal station but this may be dispensed with especially if a container with non-collapsible walls are used.

The means for supplying a coolant to the shipper container open for dispensing the goods may take the form of a blast of cold air discharged from above, may take the form of cold plates inserted into the shipper container or perhaps a grid of cold coils with vanes to insure discharge of cold air by gravity from the heat exchange vanes into the container together with means for circulating resultant warm air around the vanes for further cooling.

Other objects will appear from time to time throughout the specification and claims.

The invention is illustrated more or less diagrammatically in the accompanying drawings, wherein FIGURE 1 is a flow chart descriptive of the process in accordance with the invention;

FIGURE 2 is a perspective view of a retail dispensing station;

FIGURE 3 is a perspective view of a suitable means for cooling the contents of the bin, with parts omitted, of the dispensing station;

FIGURE 4 is a section through the cooling means.

Like parts are indicated by like characters throughout the specification and drawings.

Referring first to FIGURE 1, the flow sheet describing the proposed process indicates the various steps necessary to carry out the process from the initial entry of the food into the processing system to the point at which they are taken out of the system by the customer, preferably by the retail purchasing housewife. Steps A and B are standard in all frozen food retail operations. The food is packed in small cooking sized packages and is frequently frozen in those packages to far below zero temperatures because it is necessary to have the temperature far below zero in order to have safe protection against dangerous temperature rise.

Step C differs from the conventional because usually the frozen food packages are carried from the cold room across the dock to a truck, always insulated and usually equipped with refrigerating machinery. Thus the foodstuff is exposed to warm moisture laden ambient air as it passes across the dock. This results in condensation on the package and a temperature rise. In the present invention, an insulating shipper container is filled in the cold room without exposure of the food to warm moisture laden ambient air and the food leaves the cold room in a closed insulated shipper container.

Step D differs from convention because instead of shipping loosely packed or cartonized food packages in a refrigerated truck, the packages are undisturbed, no break of bulk and the foodstuff is able to reach the storage station in step E in substantially the same condition it was in the shipping station. If the food is shipped to a storage station in the past it had to be carried across the dock exposed to ambient air on its way from the truck to the storage cold room with resultant rise in temperature and condensation on the package and then later if as it is shipped from the central distribution station to the retailer the same thing happens. Thus, there is a second exosure in the prior art at this time. Both these exposures are completely obviated by the proposed method.

Then at step F, present practice is to move the foodstuff across the dock from the truck to the retailer's cold room where it is stored until needed. Then the frozen food is carried through the warm moisture laden atmosphere of the retail establishment to be loaded into a cold storage bin. By the proposed method, the retailer needs no cold room because the food is still in the container and the food when carried from storage to the retail point is completely insulated by the container so that only as the container is put into place is it open to ambient atmosphere and warming at that time is prevented by use of a permanent cooling means at the disposal point.

By the proposed new method then the frozen food travels without break of bulk in a continuously insulated condition from the cold room to the dispensing station and only at the dispensing station when the container is opened is any additional cooling provided because experience has taught that if the container remains closed on its travel from the freezing station to the dispensing station, the temperature will not rise anywhere near the danger point. This is in sharp contrast with the conventional arrangement where the food is exposed to warm moisture laden air as it passes from the freezing station to the truck, as it passes from the truck to the central distribution point, as it passes from the central distribution point to the retailer's cold room and as it passes from the retailer's cold room to the dispensing station.

This protection against exposure is of the utmost importance to the seller of frozen food. It frequently happens in actual practice that frozen food for one reason or another remains on the dock at the freezing station or at the distribution station or at the retail dispensing area with substantial rise in temperature and it is frequently found that special steps have to be taken somewhere along the path of travel of the food to again lower its temperature to the acceptable point and it is well established that such rise and fall of temperature is exceedingly deleterious to frozen food.

It will be understood that the expandable, contractable, insulating shipper container disclosed in co-pending applications Ser. Nos. 261,748 and 261,749 will be used for convenience but obviously a rigid wall shipper container could accomplish the same purpose.

FIGURES 2, 3 and 4 disclose the details of and the use of the dispensing fixture or sales counter assembly. The fixture includes a back wall 1, fixed end walls 2 and 3. The back wall 1 carries a canopy 4 to support cooling means 5 and a light housing 6.

The shipper containers 7 and 8 are shown in place in the fixture adapted to be lighted from above at 6 and to receive cold air from the cold air distribution member 5. A fresh filled shipper container 9 is about to be inserted in the place previously occupied by the empty shipper container 10 which is on its way out. The cover will be removed from the shipper container 9 just as it is inserted in the fixture so that immediately cold air from the cold air source 5 will commence to enter by gravity the insulated area defined by the container. The containers 7 and 8 are masked by removable, decorative front walls 11. A similar wall will be placed in front of container 9 to mask it as soon as it is in place. The cooling means 5 is hinged at 12 on the back wall 1. It includes a cold coil 13 which could be cooled by eutectic flowing from a cold source associated with the fixture not here shown or the coils 13 could be the evaporator coil of a refrigerating machine. The coil is covered or masked by a guide sheet 14 above and a guide sheet 15 below so that by gravity cold air cooled by the coil flows downwardly parallel with the wall 1 into the shipper container while warm air is drawn upwardly by gravity for recooling. This of course is just a diagram of the cooling means. Cold plates might be used. Cold air might be forced in. The point is that any suitable cooling is appropriate and necessary because of the fact that the bin remains completely open during the disposal or sales purchase but no cooler is needed during the time that the bin is closed.

The details of the packaging station, freezing station, shipping station and storage station are not illustrated as those details form no part of the present invention. Suffice it to say that in the shipping station associated with the freezing station, the temperature must be maintained far below ambient so that the food packages from the freezer are packed without rise in temperature into the shipper container or bin for further handling.

In the claims it is understood that the packaging at the food freezing station takes place while the food is not exposed to substantially higher ambient temperature.

I claim:

1. In combination, a sales fixture including fixed back and side walls and a removable front wall defining an open topped chamber, a single portable open topped insulating container socketed in and filling such chamber, masked by the front wall, cooling means carried by the fixture walls, overhanging the open top of the container, for directing a flowing sheet of cold air downwardly into the container along the back wall thereof, there being sufficient clearance between said means and the top of the container to permit withdrawal thereof after the front wall has been removed.

2. In combination, a sales fixture including fixed back and side walls and a removable front wall defining an open topped chamber, a single portable open topped insulating container socketed in and filling such chamber, masked by the front wall, the container being removable from the chamber only after the front wall has been removed, cooling means carried by the fixture walls, overhanging the open top of the container, for directing a flowing sheet of cold air downwardly into the container along the back wall thereof, there being sufficient clearance between said means and the top of the container to permit withdrawal thereof after the front wall has been removed.

3. In combination, a sales fixture including fixed back and side walls and a removable front wall defining an open topped chamber, a single portable open topped insulating container socketed in and filling such chamber, masked by the front wall, cooling means carried by the fixture walls, overhanging the open top of the container, for directing a flowing sheet of cold air downwardly into the container along the back wall thereof and for withdrawing warmed air upwardly from the container intermediate its front and back walls, there being sufficient clearance between said means and the top of the container to permit withdrawal thereof after the front wall has been removed.

4. In combination, a sales fixture including fixed back and side walls and a removable front wall defining an open topped chamber, a single portable open topped insulating container socketed in and filling such chamber, masked by the front wall, cooling means carried by the fixture walls, overhanging the open top of the container, for directing a flowing sheet of cold air downwardly into the container along the back wall thereof.

5. In a method of preparing food for retail disposal the steps of freezing food in packages of a size suitable for retail dispensing to a temperature below zero degree F., assembling a quantity of said frozen packages in an insulating zone, terminating contact of the frozen foodstuffs with the ambient atmosphere by closing the insulating zone thereby cutting off contact of the foodstuffs with the ambient atmosphere and preventing ingress of ambient atmosphere during the time the insulating zone is maintained in a closed condition, conveying the closed insulating zone in unopened condition to a retail disposal area, and opening the closed insulating zone from which the ambient atmosphere has been excluded at the retail disposal area to thereby expose the contents of the insulated zone and make said contents available for retail disposal.

References Cited by the Examiner
UNITED STATES PATENTS

| | | | |
|---|---|---|---|
| 1,825,068 | 9/1931 | Jones | 62—60 |
| 1,965,624 | 7/1934 | Young | 62—60 |
| 1,983,768 | 12/1934 | Norton | 62—60 |
| 2,239,482 | 4/1941 | Cocks | 62—60 |
| 2,618,939 | 11/1952 | Morrison | 62—60 |
| 2,984,085 | 5/1961 | Rainwater | 62—419 X |
| 3,021,691 | 2/1962 | Jacobs | 62—408 X |

EDWARD J. MICHAEL, *Primary Examiner.*